United States Patent
Hayashi et al.

(10) Patent No.: US 10,006,355 B2
(45) Date of Patent: Jun. 26, 2018

(54) VARIABLE-GEOMETRY EXHAUST TURBINE

(71) Applicant: MITSUBISHI HEAVY INDUSTRIES, LTD., Tokyo (JP)

(72) Inventors: Noriyuki Hayashi, Tokyo (JP); Takamitsu Himeno, Tokyo (JP); Takashi Arai, Tokyo (JP); Yukihide Nagayo, Tokyo (JP); Mitsuru Aiba, Tokyo (JP); Takao Yokoyama, Tokyo (JP); Toru Hoshi, Tokyo (JP); Hiroyuki Arimizu, Tokyo (JP); Toshio Sakon, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 405 days.

(21) Appl. No.: 14/759,365

(22) PCT Filed: Feb. 21, 2013

(86) PCT No.: PCT/JP2013/054405
§ 371 (c)(1),
(2) Date: Jul. 6, 2015

(87) PCT Pub. No.: WO2014/128895
PCT Pub. Date: Aug. 28, 2014

(65) Prior Publication Data
US 2015/0354444 A1 Dec. 10, 2015

(51) Int. Cl.
F04D 29/40 (2006.01)
F02B 37/24 (2006.01)
(Continued)

(52) U.S. Cl.
CPC ............ F02B 37/24 (2013.01); F01D 17/165 (2013.01); F01D 25/246 (2013.01); F02C 6/12 (2013.01);
(Continued)

(58) Field of Classification Search
CPC .......................... F01D 17/165; F01D 17/167
See application file for complete search history.

(56) References Cited

U.S. PATENT DOCUMENTS 7,431,560 B2 * 10/2008 Sterner ................ F01D 17/165
                                                                415/160
2006/0188368 A1   8/2006 Jinnai et al.
2006/0204362 A1   9/2006 Sterner

FOREIGN PATENT DOCUMENTS

CN       1818359 A       8/2006
DE    102008020932 A1 * 10/2009 ........... F01D 17/165
(Continued)

OTHER PUBLICATIONS

Decision to Grant a Patent dated Sep. 23, 2016 issued in corresponding Japanese Application No. 2015-501166 with an English Translation.
(Continued)

Primary Examiner — Logan Kraft
Assistant Examiner — Jason Fountain
(74) Attorney, Agent, or Firm — Birch, Stewart, Kolasch & Birch, LLP

(57) ABSTRACT

An object is to provide a variable-geometry exhaust turbine whereby it is possible to prevent deformation and damage to a nozzle support under a high temperature. A variable-geometry exhaust turbine includes: a nozzle mount, a nozzle support including a first end portion joined to the first surface of the nozzle mount, a nozzle plate including the first surface joined to the second end portion of the nozzle
(Continued)

support 6 and supported so as to face the nozzle mount at a distance, and the opposite second surface facing an exhaust—as channel through which exhaust gas flows, and a plurality of nozzle vanes supported rotatably between the nozzle mount and the nozzle plate. The nozzle support is capable of tilting along a radial direction so as to absorb a relative displacement in the radial direction between the nozzle mount and the nozzle plate due to thermal expansion.

20 Claims, 10 Drawing Sheets

(51) Int. Cl.
*F01D 17/16* (2006.01)
*F02C 6/12* (2006.01)
*F01D 25/24* (2006.01)
*F02B 39/00* (2006.01)

(52) U.S. Cl.
CPC .......... *F02B 39/00* (2013.01); *F05D 2220/40* (2013.01); *F05D 2230/642* (2013.01); *Y02T 10/144* (2013.01)

(56) References Cited

FOREIGN PATENT DOCUMENTS

| | | |
|---|---|---|
| EP | 1 707 755 A1 | 10/2006 |
| JP | 4-134119 A | 5/1992 |
| JP | 2001-329851 A | 11/2001 |
| JP | 2006-220053 A | 8/2006 |
| JP | 2006-348892 A | 12/2006 |
| JP | 2007-23840 A | 2/2007 |
| JP | 4031631 B2 | 1/2008 |
| JP | 2010-53773 A | 3/2010 |
| JP | 4491766 B2 | 6/2010 |
| JP | 4755071 B2 | 8/2011 |
| JP | 2012-102747 A | 5/2012 |
| KR | 10 2008 000 860 A1 | 10/2009 |
| KR | 10 2008 020 932 A1 | 10/2009 |
| WO | WO 2008/098024 A2 | 8/2008 |

OTHER PUBLICATIONS

Extended European Search Report, dated Feb. 15, 2016, for corresponding European Application No. 13876031.9.
Chinese Office Action dated Nov. 22, 2016, issued in the corresponding CN Application No. 201380070928.0 with an English Translation.
International Preliminary Report on Patentability and English translation of the Written Opinion of the International Searching Authority (forms PCT/IB/373, PCT/ISA/237, PCT/IB/338 and PCT/IB/326), dated Sep. 3, 2015, for International Application No. PCT/JP2013/054405.
International Search Report and Written Opinion of the International Searching Authority (forms PCT/ISA/210, PCT/ISA/237 and PCT/ISA/220), dated Jun. 4, 2013, for International Application No. PCT/JP2013/054405.

* cited by examiner

RELATED ART

VARIABLE-GEOMETRY EXHAUST TURBINE

TECHNICAL FIELD

The present disclosure relates to a variable-geometry exhaust turbine.

BACKGROUND

For an exhaust turbocharger, often used is a variable nozzle mechanism disposed between an exhaust-gas channel of a scroll shape formed in a turbine housing and a turbine wheel rotatably disposed at the center of the turbine housing. The variable nozzle mechanism controls a flow of exhaust gas that acts on the turbine wheel.

Such a variable nozzle mechanism includes a nozzle mount and a nozzle plate supported by a nozzle support so as to be spaced from each other, and a plurality of nozzle vanes rotatably supported between the nozzle mount and the nozzle plate. The vane angle of the nozzle vanes is varied to control the flow of exhaust gas flowing between the nozzle mount and the nozzle plate, thereby controlling the flow of the exhaust gas acting on the turbine wheel.

Patent Documents 1 and 2, for example, disclose an example of a variable-geometry exhaust turbine having the above variable nozzle mechanism.

CITATION LIST

Patent Literature

Patent Document 1: JP4491766B
Patent Document 2: JP2010-53773A

SUMMARY

Problems to be Solved

Exhaust gas emitted from a diesel engine has a temperature as high as approximately 850° C., which may cause thermal deformation in a nozzle mount and a nozzle plate. At this time, the amount of thermal expansion in the radial direction is varied between the nozzle mount fixed to e.g. a bearing housing and in contact with the high-temperature exhaust gas only at a surface facing nozzle supports, and the nozzle plate exposed to the high-temperature exhaust gas at both surfaces. Thus, as illustrated in FIG. 15, there is a risk that the nozzle mount 2 warps and a shearing force and a bending moment act on the nozzle supports 6 coupling the nozzle plate 4 and the nozzle mount 2, which may lead to deformation of the nozzle supports 6.

Further, particularly in a case where a gasoline engine is equipped with the variable-geometry exhaust turbine having the variable nozzle mechanism, the temperature of exhaust gas emitted from the gasoline engine is expected to rise higher than 850° C., and thus there is a risk that the above described difference in the amount of thermal expansion between the nozzle mount and the nozzle plate further increases, the shearing force and the bending moment applied to the nozzle supports becoming even larger.

At least one embodiment of the present invention was made in view of the above problems of the conventional techniques. An object of the least one embodiment of the present invention is to provide a variable-geometry exhaust turbine whereby it is possible to prevent deformation and damage to the nozzle support under a high temperature.

Solution to the Problems

A variable-geometry exhaust turbine according to at least one embodiment of the present invention includes: a nozzle mount including a first surface and a second surface; a nozzle support including a first end portion and a second end portion, the first end portion being joined to the first surface of the nozzle mount; a nozzle plate including a first surface and a second surface, the first surface being joined to the second end portion of the nozzle support and supported so as to face the nozzle mount at a distance from the nozzle mount, and the second surface facing an exhaust gas channel through which exhaust gas flows; and at least one nozzle vane supported rotatably between the nozzle mount and the nozzle plate. The nozzle support is capable of tilting along a radial direction so as to absorb a relative displacement in the radial direction between the nozzle mount and the nozzle plate due to thermal expansion.

According to the above variable-geometry exhaust turbocharger, the nozzle support is capable of tilting along the radial direction so as to absorb the relative displacement in the radial direction between the nozzle mount and the nozzle plate due to the thermal expansion. Thus, even in case of occurrence of thermal expansion to the nozzle mount and the nozzle plate due to the high-temperature exhaust gas, the nozzle support tilts to absorb the relative displacement between the nozzle mount and the nozzle plate due to the difference in the amount of thermal expansion. In this way, a shearing force and a bending moment do not act on the nozzle support, which makes it possible to prevent deformation and damage of the nozzle support.

In some embodiments, at least one of the first end portion or the second end portion of the nozzle support comprises an end portion formed in a spherical shape. A housing-and-retaining part is formed on at least one of the nozzle mount or the nozzle plate. The housing-and-retaining part slidably houses the end portion formed in the spherical shape.

According to the above embodiment, an end portion of the nozzle support formed in a spherical shape is housed slidably in the housing-and-retaining part. Thus, it is possible to tilt the nozzle support in the radial direction while the nozzle support is stably joined to the nozzle mount and the nozzle plate.

In one embodiment, the end portion formed in the spherical shape of the nozzle support is housed in the housing-and-retaining part, by swaging an insertion inlet of the housing-and-retaining part while the end portion formed in the spherical shape is inserted from the insertion inlet to be disposed in the housing-and-retaining part. The insertion inlet is an opening into which the end portion formed in the spherical shape is loosely insertable.

According to the present embodiment, it is possible to house the end portion of the nozzle support in the housing-and-retaining part by a simplified assembly method of only inserting the end portion of the nozzle support into the housing-and-retaining part and then swaging the insertion inlet.

In another embodiment, the end portion formed in the spherical shape of the nozzle support is housed in the housing-and-retaining part, by fixing a retaining member formed as a separate member from the nozzle mount and the nozzle plate into an insertion inlet of the housing-and-retaining part while the end portion formed in the spherical shape is inserted from the insertion inlet to be disposed in the housing-and-retaining part. The insertion inlet is an opening into which the end portion formed in the spherical shape is loosely insertable.

According to the present embodiment, it is possible to house the end portion of the nozzle support in the housing-and-retaining part by a simplified assembly method of only inserting the end portion of the nozzle support into the housing-and-retaining part and then fixing the retaining member formed as a separate member into the insertion inlet.

In yet another embodiment, the end portion formed in the spherical shape of the nozzle support is housed in the housing-and-retaining part, by press fitting the end portion formed in the spherical shape from a press-fit inlet of the housing-and-retaining part. The press-fit inlet is an opening into which the end portion formed in the spherical shape is not loosely insertable.

According to the present embodiment, it is possible to house the end portion of the nozzle support in the housing-and-retaining part by a simplified assembly method of only press fitting the end portion of the nozzle support from the press-fit inlet of the housing-and-retaining part.

In some embodiments, the nozzle support includes two segments, which are a first-end-side segment having the first end portion formed in the spherical shape and a second-end-side segment having the second end portion formed in the spherical shape. The first-end-side segment and the second-end-side segment are joined to each other while the first end portion of the first-end-side segment is housed in a mount-side housing-and-retaining part formed on the nozzle mount and the second end portion of the second-end-side segment is housed in a plate-side housing-and-retaining part formed on the nozzle plate.

According to the above embodiment, the nozzle support includes two segments: the first-end-side segment and the second-end-side segment. Thus, it is possible to house the opposite end portions of the nozzle support respectively in the mount-side housing-and-retaining part and the plate-side housing-and-retaining part by a simplified asembly method of joining the first-end-side segment and the second-end-side segment while the first end portion of the first-end-side segment is housed in the mount-side housing-and-retaining part and the second end portion of the second-end-side segment is housed in the plate-side housing-and-retaining part.

In some embodiments, the housing-and-retaining part includes a mount-side housing-and-retaining part formed on the nozzle mount and a plate-side housing-and-retaining part formed on the nozzle plate, and the nozzle support is formed in a spherical shape at both of the first end portion and the second end portion. The insertion inlet of the mount-side housing-and-retaining part is formed on the first surface of the nozzle mount facing the nozzle plate, and the insertion inlet of the plate-side housing-and-retaining part is formed on the first surface of the nozzle plate facing the nozzle mount.

According to the above embodiment, the mount-side housing-and-retaining part and the plate-side housing-and-retaining part are respectively formed on the first surface of the nozzle mount and the first surface of the nozzle plate facing each other. Thus, even if the nozzle support is not divided, it is possible to house and retain the opposite end portions of the nozzle support in the mount-side housing-and-retaining part and the plate-side housing-and-retaining part by the above simplified assembly method.

In some embodiments, a housing-and-retaining part forming body is fixed to at least one of the nozzle mount or the nozzle plate. The housing-and-retaining part forming body is formed as a separate member from the nozzle mount and the nozzle plate, and includes the housing-and-retaining part formed inside.

According to the above embodiment, the housing-and-retaining part forming body with the housing-and-retaining part formed inside is formed as a separate member from the nozzle mount and the nozzle plate. Thus, even if there occurs a defect during swaging, press fitting or fixing by a retaining member when the end portion of the nozzle support is housed in the housing-and-retaining part, the nozzle mount and the nozzle plate would not be affected, which makes it possible to prevent deterioration in the material yield.

In some embodiments, the nozzle support includes a nozzle support body, and a joint part. The joint part includes a trunk portion having a rod shape and protruding from at least one of end surfaces of the nozzle support body, and a head portion disposed on a distal end side of the trunk portion. The head portion has a cross section larger than that of the trunk portion. A through hole into which the trunk portion of the joint part is loosely inserted is formed on at least one of the nozzle mount or the nozzle plate. A joint housing part in which the head portion of the joint part is slidably disposed is formed in a recess shape on the second surface of the at least one of the nozzle mount or the nozzle plate.

According to the above embodiment, the trunk portion of the joint part is loosely inserted, i.e., inserted with allowance into the through hole of the nozzle mount and the nozzle plate, while the head portion of the joint part is disposed slidably in the joint housing part formed into a recess shape on the second surface of the nozzle mount and the nozzle plate. Thus, it is possible to tilt the nozzle support in the radial direction while the nozzle support is stably joined to and the nozzle mount and the nozzle plate.

In one embodiment, the joint part includes a fastening member joined to one of the end surfaces of the nozzle support body.

According to the above embodiment, it is possible to form the above joint part with a simplified configuration in which a fastening member is merely joined to the end surface of the nozzle support body.

In another embodiment, the head portion of the joint part is formed by swaging a distal end of the trunk portion, while the trunk portion is loosely inserted into the through hole and a distal end side of the trunk portion is protruded from the joint housing part.

According to the above embodiment, it is possible to form the above joint part by swaging the distal end portion of the trunk portion, which makes it possible to reduce the number of constituent members as compared to a case where a fastening member, for instance, is used to form the joint part.

In some embodiments, a spherical washer is disposed on the joint housing part. The fastening member includes a spherical convex portion formed so as to be slidable with respect to a spherical concave seating surface of the spherical washer. The spherical convex portion is disposed between the head portion and the trunk portion.

According to the above embodiment, in a case where the above joint part is formed by the fastening member, it is possible to dispose the head portion of the joint part slidably in the joint part, with a simplified configuration in which the spherical washer is disposed on the joint part.

In some embodiments, the joint housing part is formed in a spherical concave shape. The head portion of the joint part is formed in a spherical convex shape at a side adjacent to the trunk portion so as to fit slidably with the joint housing part formed in a spherical concave shape.

According to the above embodiment, it is possible to dispose the head portion of the joint part slidably in the joint housing part with a simplified configuration.

In some embodiments, the joint housing part is formed in a conical concave shape, and an elastic member is disposed between the head portion of the joint part and the joint housing part formed in the conical concave shape.

According to the above embodiment, it is possible to dispose the head portion of the joint part slidably in the joint housing part with a simplified configuration in which the elastic member is merely disposed between the head portion of the joint part and the joint housing portion. Further, the joint housing part and head portion of the joint part can be formed into a simple shape.

In one embodiment, a spherical section formed in a spherical shape is formed on the first surface of at least one of the nozzle mount or the nozzle plate. At least one of the end surfaces of the nozzle support body is formed so as to be slidable with respect to the spherical section.

According to the above embodiment, the spherical section formed on the first surface of the nozzle mount or the nozzle plate slides with an end surface of the nozzle support body, so that the nozzle support can tilt in a smooth motion, which makes it possible to absorb the relative displacement between the nozzle mount and the nozzle plate in the radial direction quickly.

In another embodiment, a second elastic member is disposed between at least one of the end surfaces of the nozzle support body and the first surface of at least one of the nozzle mount or the nozzle plate.

According to the above embodiment, it is possible to tilt the nozzle support in a smooth motion, with a simplified configuration in which the second elastic member is merely disposed between the first surface of the nozzle mount or the nozzle plate and an end surface of the nozzle support body. Thus, it is possible to absorb the relative displacement in the radial direction between the nozzle mount and the nozzle plate.

In another embodiment, a slit for allowing tilting of the nozzle support body along the radial direction is formed on at least one of end portions of the nozzle support body.

According to the above embodiment, it is possible to tilt the nozzle support in a smooth motion with a simplified configuration in which the slit is merely formed on an end portion of the nozzle support body and the number of the constituent member is small. Further, it is possible to absorb the relative displacement in the radial direction between the nozzle mount and the nozzle plate quickly.

In some embodiments, the nozzle support includes a first-end-side support member joined to the nozzle mount, a second-end-side support member joined to the nozzle plate, and a pin member which joins the first-end-side support member and the second-end-side support member rotatably along the radial direction.

According to the above embodiment, the first-end-side support member and the second-end-side support member are coupled to each other so as to be rotatable in the radial direction, so that the nozzle support is capable of tilting at least along the radial direction. Thus, deformation and damage of the nozzle support is prevented.

In some embodiments, the nozzle mount is formed from a material having a linear expansion coefficient smaller than that of a material forming the nozzle plate.

According to the above embodiment, the nozzle plate is made from a material that easily expands due to heat as compared to the nozzle mount. Thus, it is possible to restrict the rotation angle at a joint between the nozzle support and the nozzle mount and the nozzle plate when the nozzle mount deforms so as to warp toward the second surface due to thermal expansion of the nozzle plate, which makes it possible to reduce abrasion at the joint.

In some embodiments, the variable-geometry exhaust turbine is used for a gasoline engine.

A gasoline engine emits exhaust gas having a temperature even higher than that of a diesel engine. Thus, in a variable-geometry exhaust turbine used in a gasoline engine, the difference in the amount of heat expansion between the nozzle mount and the nozzle plate is even greater. In this regard, the variable-geometry exhaust turbine of the above embodiment can be suitably used in a gasoline engine in particular.

Advantageous Effects

According to at least one embodiment of the present invention, the nozzle support is configured to be capable of tilting along the radial direction of the nozzle support, which makes it possible to provide a variable-geometry exhaust turbine whereby it is possible to prevent deformation and damage to a nozzle support under a high temperature.

BRIEF DESCRIPTION OF DRAWINGS

FIG. 13A corresponds to the embodiment illustrated in FIG. 11, and FIG. 13B corresponds to the embodiment illustrated in FIG. 12.

FIG. 14A is a planar view and FIG. 14B is a side view.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
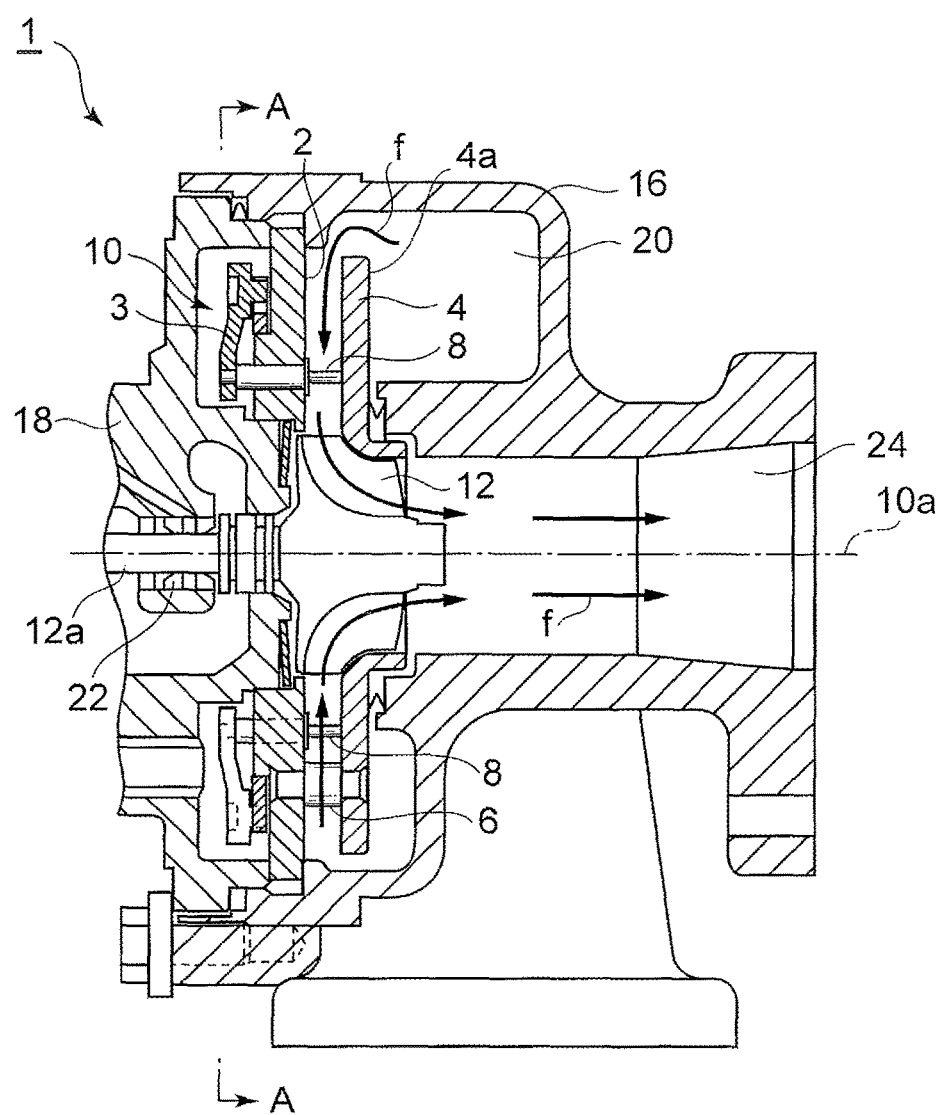
FIG. 1 is a cross-sectional view of a variable-geometry exhaust turbine according to one embodiment of the present invention.
Figure 2:
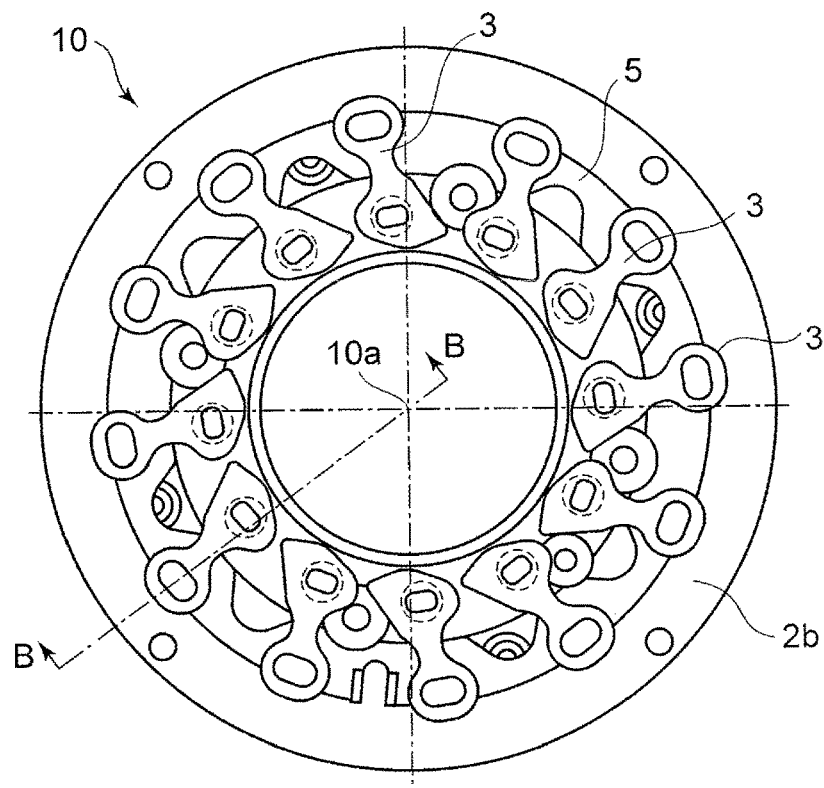
FIG. 2 is a cross-sectional view taken along line A-A of FIG. 1.
Figure 3:
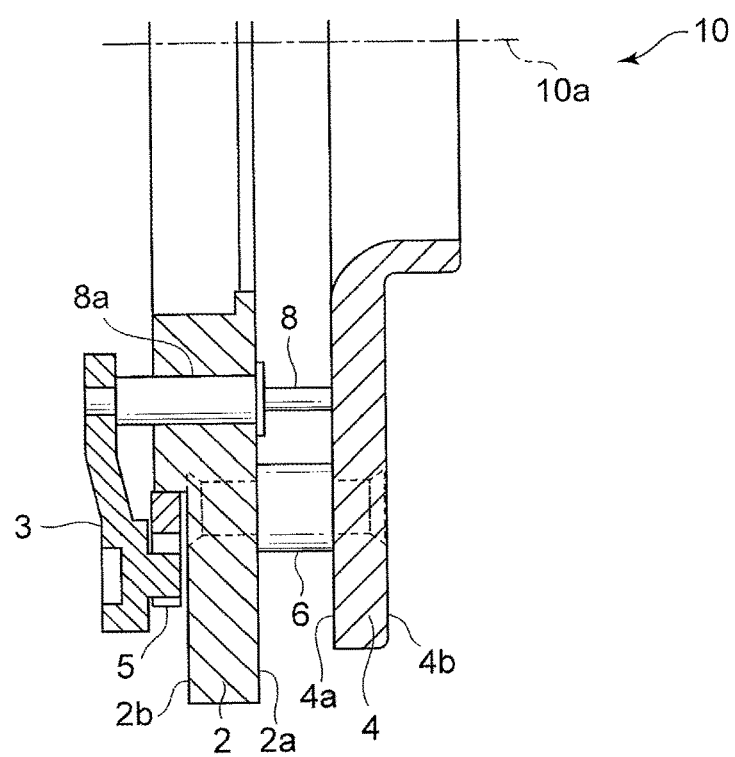
FIG. 3 is a cross-sectional view taken along line B-B of FIG. 2.

FIG. 1 is a cross-sectional view of a variable-geometry exhaust turbine according to one embodiment of the present invention. FIG. 2 is a cross-sectional view taken along line A-A of FIG. 1. FIG. 3 is a cross-sectional view taken along line B-B of FIG. 2. In the beginning, the basic configuration of a variable-geometry exhaust turbine 1 according to one embodiment of the present invention will be described with reference to FIGS. 1 to 3.

As illustrated in FIG. 1, the variable-geometry exhaust turbine 1 according to one embodiment of the present invention includes a turbine housing 16 which houses a turbine rotor 12, and a bearing housing 18 which houses a bearing 22 supporting a rotation shaft 12a of the turbine rotor 12 rotatably. The turbine housing 16 and the bearing housing 18 are joined to each other by e.g. bolts. Further, although not illustrated, at the opposite side of the bearing housing 18 to the turbine housing 16, a compressor housing that houses a compressor rotor coupled to the rotation shaft 12a is joined to the bearing housing 18.

On the outer circumferential side of the turbine housing 16, an exhaust-gas channel 20 having a scroll shape is formed. The exhaust-gas channel 20 communicates with an exhaust-gas manifold (not illustrated), and exhaust gas discharged from an engine flows through the exhaust-gas channel 20. Further, a variable nozzle mechanism 10 for controlling the flow of the exhaust gas acting on the turbine rotor 12 is disposed between the exhaust-gas channel 20 having a scroll shape and the turbine rotor 12.

As illustrated in FIG. 1, a nozzle mount 2 of the variable nozzle mechanism 10 is fastened to the bearing housing 18 by e.g. bolts, while the variable nozzle mechanism 10 is interposed between the turbine housing 16 and the bearing housing 18. In this way, the variable nozzle mechanism 10 is fixed to the bearing housing 18. Further, as illustrated in FIG. 3, the variable nozzle mechanism 10 includes a nozzle support 6 which is a pillar-shape member joined to the first surface 2a of the nozzle mount 2 at one end. To the other end of the nozzle support 6, the first surface 4a of the nozzle plate 4 is joined. A plurality of nozzle supports 6 is coupled to the first surface 2a of the nozzle mount 2 and the first surface 4a of the nozzle plate 4 so as to be arranged in a circumferential fashion in a planar view. In this way, the nozzle plate 4 is supported so as to be spaced from the first surface 2a of the nozzle mount 2.

Further, as illustrated in FIGS. 2 and 3, a drive ring 5 formed in a disc shape is disposed rotatably on the second surface 2b of the nozzle mount 2. To the drive ring 5, a plurality of lever plates 3 is each joined at one end. The other ends of the lever plates 3 are joined to nozzle vanes 8 via nozzle shafts 8a so that each lever plate 3 rotates when the drive ring 5 rotates, thereby varying the vane angle of the nozzle vanes 8.

In the variable-geometry exhaust turbine 1 having the above configuration, the exhaust gas having flowed through the exhaust-gas channel 20 of a scroll shape flows into a gap between the nozzle mount 2 and the nozzle plate 4 as indicated by arrows "f" in FIG. 1, has a flow direction controlled by the nozzle vanes 8, and flows into the center section of the turbine housing 16. Then, after acting on the turbine rotor 12, the exhaust gas exits the exhaust-gas outlet 24 to the outside.

At this time, as illustrated in FIG. 1, the second surface 4b of the nozzle plate 4, which is opposite to the first surface 4a joined with the nozzle supports 6, is disposed so as to face the exhaust-gas channel 20 through which the exhaust gas flows. In this way, the nozzle plate 4 is exposed to the exhaust gas at both surfaces: the first surface 4a and the second surface 4b. In contrast, the nozzle mount 2 contacts the exhaust gas only at the first surface 2a, while the second surface 2b is not exposed to the exhaust gas for being oriented toward the bearing housing 18.

Figure 12:
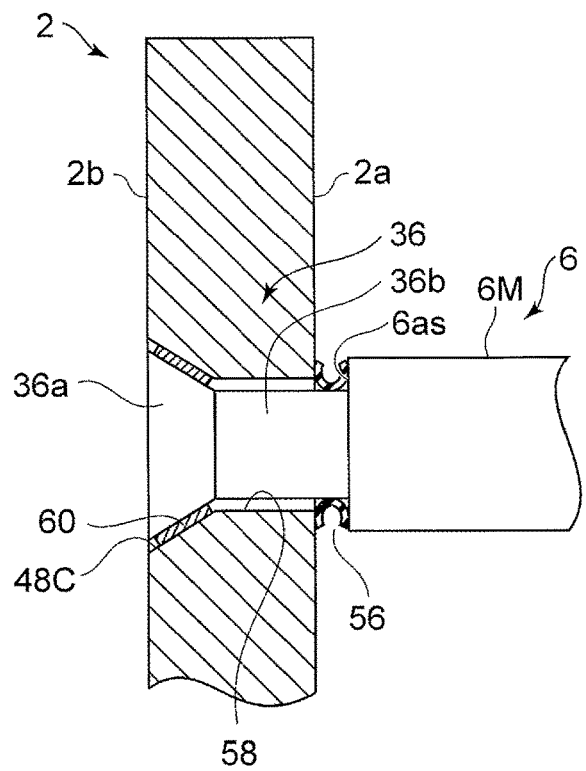
FIG. 12 is a diagram of a joint structure among a nozzle support, a nozzle mount and a nozzle plate according to one embodiment.

As described above, while the nozzle plate 4 is exposed to the exhaust gas at both of the surfaces 4a and 4b, the nozzle mount 2 contacts the exhaust gas only at the first surface 2a. Thus, the nozzle plate 4 has a temperature higher than that of the nozzle mount 2 when the engine is in operation, and therefore expands due to heat by a great amount. Further, the temperature of the nozzle mount 2 is greatly varied between the first surface 2a and the second surface 2b, which results in warping deformation due to the thermal expansion. Thus, as illustrated in FIG. 12 described above, there is a risk that the nozzle supports 6 coupling the nozzle plate 4 and the nozzle mount 2 deform due to a shearing force and a bending moment applied to the nozzle supports 6.

Thus, in at least one embodiment of the present invention, as described below with reference to the following embodiments, each nozzle support 6 is configured to be capable of tilting along the radial direction so as to absorb the relative displacement in the radial direction between the nozzle mount 2 and the nozzle plate 4 due to the thermal expansion.

With the above variable-geometry exhaust turbine 1, even in case of occurrence of thermal expansion to the nozzle mount 2 and the nozzle plate 4 due to the high-temperature exhaust gas, the nozzle supports 6 tilt to absorb the relative displacement between the nozzle mount 2 and the nozzle plate 4 due to the difference in the amount of thermal expansion. Thus, a great shearing force and a great bending moment do not act on the nozzle support 6, which makes it possible to prevent deformation and damage of the nozzle support 6.

Figure 4:
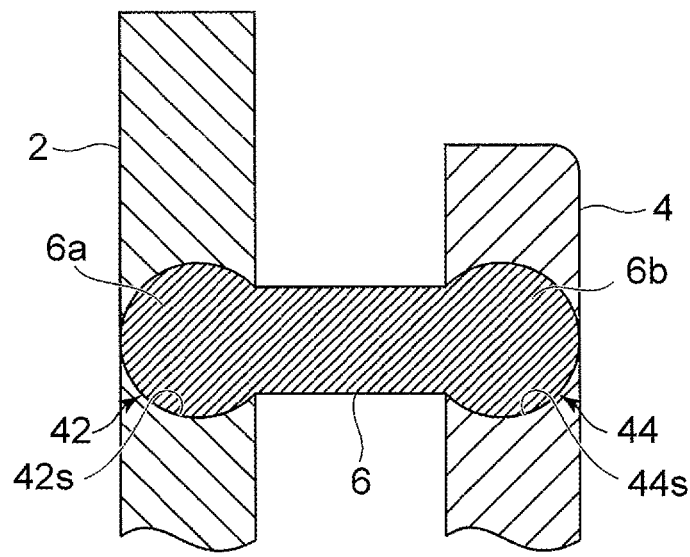
FIG. 4 is a diagram of a joint structure among a nozzle support, a nozzle mount and a nozzle plate according to one embodiment.

FIG. 4 is a diagram of a joint structure among a nozzle support 6, a nozzle mount 2, and a nozzle plate 4 according to one embodiment.

In some embodiments, as illustrated in FIG. 4, at least one of the first end portion 6a or the second end portion 6b of each nozzle support 6 is formed in a spherical shape, and housing-and-retaining parts 42, 44 that house the end portions having a spherical shape slidably are formed on at least one of the nozzle mount 2 or the nozzle plate 4.

For instance, in the embodiment illustrated in FIG. 4, both of the first end portion 6a and the second end portion 6b of each nozzle support 6 are formed in a spherical shape. Further, a mount-side housing-and-retaining part 42 that slidably houses the first end portion 6a of the nozzle support 6 is formed on the nozzle mount 2, and a plate-side housing-and-retaining part 44 that slidably houses the second end portion 6b of the nozzle support 6 is formed on the nozzle plate 4. The inner surfaces 42s, 44s of the mount-side housing-and-retaining part 42 and the plate-side housing-and-retaining part 44 are each formed to have an arc-shaped cross section, so as to serve as receiving seat surfaces 42s, 44s to which the first end portion 6a and the second end portion 6b of the nozzle support 6 contact respectively so as to be slidable.

According to the above embodiment, at least one of the first end portion 6a or the second end portion 6b of the nozzle support 6 having a spherical shape is housed slidably in the mount-side housing-and-retaining part 42 or the plate-side housing-and-retaining part 44. Thus, it is possible to tilt the nozzle support 6 along the radial direction while the nozzle support 6 is stably joined to the nozzle mount 2 and the nozzle plate 4.

Figure 5:
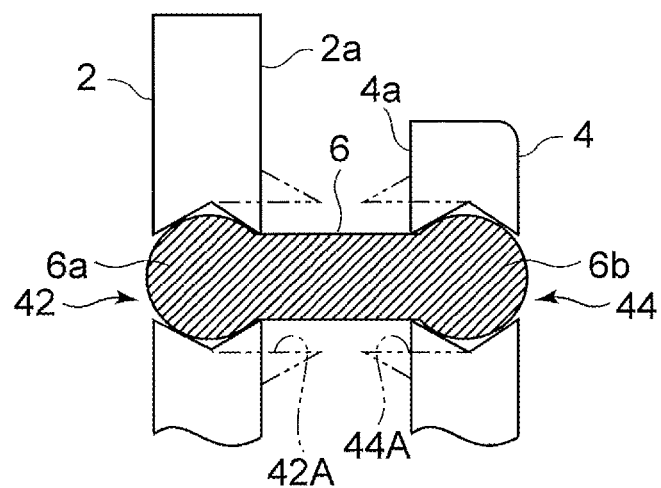
FIG. 5 is a diagram of a joint structure among a nozzle support, a nozzle mount and a nozzle plate according to one embodiment.

FIG. 5 is a diagram of a joint structure among a nozzle support, a nozzle mount and a nozzle plate according to one embodiment.

In one embodiment, as illustrated in FIG. 5, the first end portion 6a and the second end portion 6b of the nozzle support 6 having a spherical shape are inserted from insertion inlets 42A, 44A of the housing-and-retaining parts 42, 44. The insertion inlets 42A, 44A are openings formed so that the end portions 6a, 6b having a spherical shape are loosely insertable. While the end portions 6a, 6b are disposed in the housing-and-retaining parts 42, 44, the insertion inlets 42A, 44A are swaged, so that the end portions 6a, 6b are housed in the housing-and-retaining parts 42, 44. The dotted lines in the drawing represent a state before the insertion inlets 41A, 44A are swaged.

According to the present embodiment, it is possible to house the end portions 6a, 6b of the nozzle support 6 in the housing-and-retaining parts 42, 44 by a simplified assembly method of only inserting the end portions 6a, 6b of the nozzle support 6 into the housing-and-retaining parts 42, 44 and then swaging the insertion inlets 42A, 44A. Here, the cross-sectional shape of the inner surfaces of the housing-and-retaining parts 42, 44 only needs to be a shape capable of slidably housing an end portion of the nozzle support 6 having a spherical shape, and thus not limited to the arc-shaped cross section illustrated in FIG. 4. The cross-sectional shape may be a rhomboid shape illustrated in FIG. 5.

Figure 6:
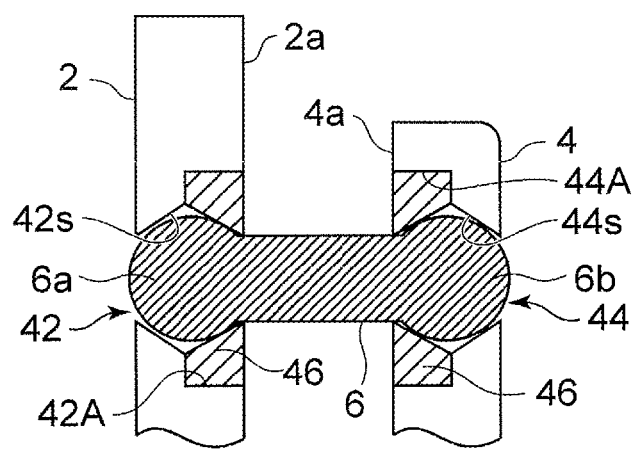
FIG. 6 is a diagram of a joint structure among a nozzle support, a nozzle mount and a nozzle plate according to another embodiment.

FIG. 6 is a diagram of a joint structure among a nozzle support 6, a nozzle mount 2 and a nozzle plate 4 according to another embodiment.

In another embodiment, as illustrated in FIG. 6, the first end portion 6a and the second end portion 6b of the nozzle support 6 having a spherical shape are respectively inserted from insertion inlets 42A, 44A of the housing-and-retaining parts 42, 44. The insertion inlets 42A, 44A are openings formed so that the end portions 6a, 6b having a spherical shape are insertable loosely, i.e. with allowance. Then, while the end portions 6a, 6b are disposed in the housing-and-retaining parts 42, 44, retaining members 46 formed separately from the nozzle mount 2 and the nozzle plate 4 are fixed respectively in the insertion inlets 42A, 44A, so that the end portions 6a, 6b are housed in the housing-and-retaining parts 42, 44. In the present embodiment, a surface of each retaining member 46 constitutes a part of the receiving seat surfaces 42s, 44s of the housing-and-retaining parts 42, 44. To fix the retaining members 46 to the nozzle mount 2 and the nozzle plate 4, several kinds of fixing methods may be adopted, such as welding and swaging.

According to the present embodiment, it is possible to house the end portions 6a, 6b of the nozzle support 6 in the housing-and-retaining parts 42, 44 by a simplified assembly method of only inserting the end portions 6a, 6b of the nozzle support 6 into the housing-and-retaining parts 42, 44 and then fixing the retaining members 46 formed as separate members into the insertion inlets 42A, 44A.

Figure 7:
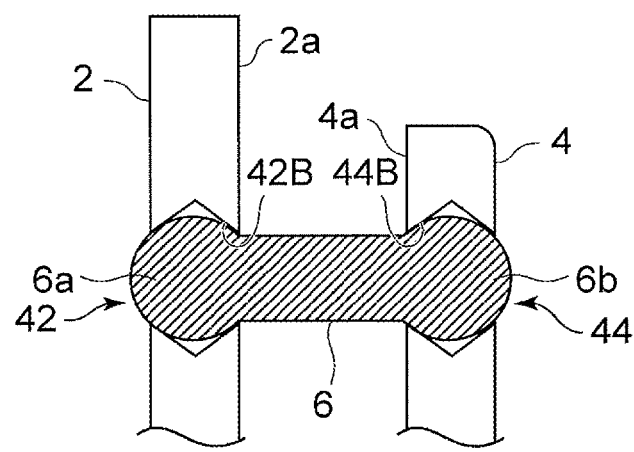
FIG. 7 is a diagram of a joint structure among a nozzle support, a nozzle mount and a nozzle plate according to yet another embodiment.

FIG. 7 is a diagram of a joint structure among a nozzle support 6, a nozzle mount 2 and a nozzle plate 4 according to yet another embodiment.

In another embodiment, as illustrated in FIG. 7, the first end portion 6a and the second end portion 6b of the nozzle support 6 having a spherical shape are inserted from press-fit inlets 42B, 44B of the housing-and-retaining parts 42, 44 to be housed in the housing-and-retaining parts 42, 44. The press-fit inlets 42B, 44B are openings formed such that the end portions 6a, 6b having a spherical shape are not insertable loosely, i.e. with allowance. In the present embodiment, the first end portion 6a and the second end portion 6b of the nozzle support 6 are press fit respectively from the first surface 2a of the nozzle mount 2 and the first surface 4a of the nozzle plate 4.

According to the present embodiment, it is possible to house the end portions 6a, 6b of the nozzle support 6 in the housing-and-retaining parts 42, 44 by a simplified assembly method of only press fitting the end portions of the nozzle support 6 from the press-fit inlets 42B, 44B of the housing-and-retaining parts 42, 44.

Figure 8:
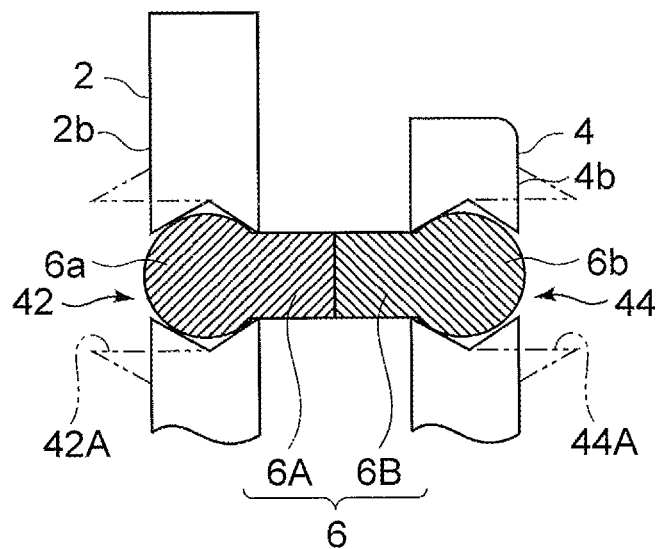
FIG. 8 is a diagram of a joint structure among a nozzle support, a nozzle mount and a nozzle plate according to one embodiment.

FIG. 8 is a diagram of a joint structure among a nozzle support 6, a nozzle mount 2 and a nozzle plate 4 according to one embodiment.

In some embodiments, as illustrated in FIG. 8, the nozzle support 6 includes two segments: a first-end-side segment 6A having the first end portion 6a formed in a spherical shape, and a second-end-side segment 6B having the second end portion 6B formed in a spherical shape. The first-end-side segment 6A and the second-end-side segment 6B are joined to each other, while the first end portion 6a of the first-end-side segment 6A is housed in the mount-side housing-and-retaining part 42 formed on the nozzle mount 2, and the second end portion 6b of the second-end-side segment 6B is housed in the plate-side housing-and-retaining part 44 formed on the nozzle plate 4. The first-end-side segment 6A and the second-end-side segment 6B are joined to each other by welding, or by fastening members such as bolts. Further, in the present embodiment, the insertion inlets 42A, 44A are respectively disposed on the second surface 2b of the nozzle mount 2 and the second surface 4b of the nozzle plate 4. After the first-end-side segment 6A and the second-end-side segment 6B are joined, the insertion inlets 42A, 44A are swaged, so that the end portions 6a, 6b of the nozzle support 6 are retained in the housing-and-retaining parts 42, 44.

According to the above embodiment, the nozzle support 6 includes two segments: the first-end-side segment 6A and the second-end-side segment 6B. Thus, it is possible to house the opposite end portions 6a, 6b of the nozzle support 6 respectively in the mount-side housing-and-retaining part 42 and the plate-side housing-and-retaining part 44 by a simplified assembly method of joining the first-end-side segment 6A and the second-end-side segment 6B while the first end portion 6a of the first-end-side segment 6A is housed in the mount-side housing-and-retaining part 42 and the second end portion 6b of the second-end-side segment 6B is housed in the plate-side housing-and-retaining part 44.

Further, in some embodiments, as illustrated in FIGS. 5 and 6, the housing-and-retaining parts include the mount-side housing-and-retaining part 42 formed on the nozzle mount 2 and the plate-side housing-and-retaining part 44 formed on the nozzle plate 4. The nozzle support 6 is formed in a spherical shape at both end portions: the first end portion 6a and the second end portion 6b. The insertion inlet 42A of the mount-side housing-and-retaining part 42 is formed on the first surface 2a of the nozzle mount 2 facing the nozzle plate 4, and the insertion inlet 44A of the plate-side housing-and-retaining part 44 is formed on the first surface 4a of the nozzle plate 4 facing the nozzle mount 2.

According to the above embodiment, the mount-side housing-and-retaining part 42 and the plate-side housing-and-retaining part 44 are respectively formed on the first surface 2a of the nozzle mount 2 and the first surface 4a of the nozzle plate 4 facing each other. Thus, even if the nozzle support 6 is not divided, unlike the embodiment illustrated in FIG. 8, it is possible to house and retain the opposite end portions 6a, 6b of the nozzle support 6 in the mount-side housing-and-retaining part 42 and the plate-side housing-and-retaining part 44 by a simplified assembly method.

Figure 9:
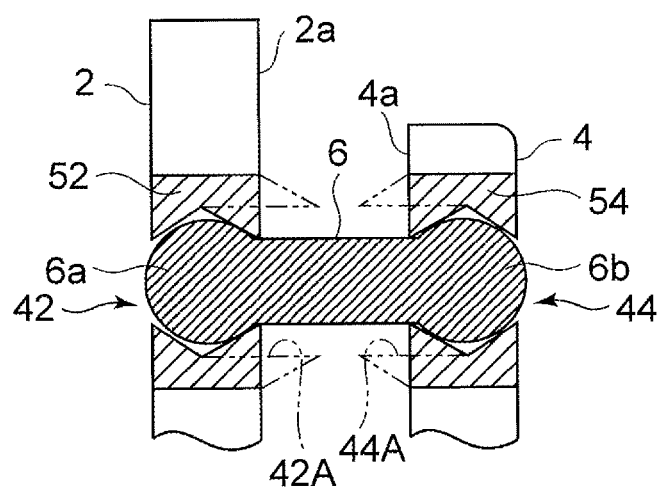
FIG. 9 is a diagram of a joint structure among a nozzle support, a nozzle mount and a nozzle plate according to one embodiment.

FIG. 9 is a diagram of a joint structure among a nozzle support 6, a nozzle mount 2 and a nozzle plate 4 according to one embodiment.

In some embodiments, as illustrated in FIG. 9, housing-and-retaining part forming bodies 52, 54 are respectively fixed to at least one of the nozzle mount 2 or the nozzle plate 4. The housing-and-retaining part forming bodies 52, 54 are formed separately from the nozzle mount 2 and the nozzle plate 4, and include the housing-and-retaining parts 42, 44 formed inside. The above housing-and-retaining part forming bodies 52, 54 are respectively fixed to the nozzle mount 2 and the nozzle plate 4 by welding, for instance. Further, while the end portions 6a, 6b of the nozzle support 6 are disposed and housed in the housing-and-retaining parts 42, 44 by swaging the insertion inlets 42A, 44A in the embodiment illustrated in FIG. 9, the end portions 6a, 6b of the nozzle support 6 may be retained in the housing-and-retaining parts 42, 44 by other methods, such as press fitting or fixing by the retaining members 46.

According to the above embodiment, the housing-and-retaining part forming bodies 52, 54 with the housing-and-retaining parts 42, 44 formed inside are formed separately from the nozzle mount 2 and the nozzle plate 4. Thus, even if there occurs a defect during swaging, press fitting or fixing by the retaining members when the end portions 6a, 6b of the nozzle support 6 are respectively housed in the housing-and-retaining parts 42, 44, the nozzle mount 2 and the nozzle plate 4 would not be affected, which makes it possible to prevent deterioration in the material yield.

FIGS. 10 to 13 are diagrams of a joint structure among a nozzle support 6, a nozzle mount 2 and a nozzle plate 4 according to one embodiment.

While a joint structure between the nozzle mount 2 and the nozzle support 6 is illustrated in FIGS. 10 to 13, the joint structure between the nozzle plate 4 and the nozzle support 6 may have a similar configuration.

In some embodiments, as illustrated in FIGS. 10 to 13, the nozzle support 6 includes a nozzle support body 6M and a joint part 36. The joint part 36 includes a trunk portion 36b having a rod shape and protruding from the first end surface 6as (the second end surface 6bs) of the nozzle support body 6M, and a head portion 36a disposed on the distal end side of the trunk portion 36b. The head portion 36a has a cross section larger than that of the trunk portion 36b. A through hole 58 into which the trunk portion 36b of the joint part 36 is loosely inserted is formed on the nozzle mount 2 (nozzle plate 4), and a joint housing part 48 in which the head portion 36a of the joint part 36 is slidably disposed is formed in a recess shape on the second surface 2b (4b) of the nozzle mount 2 (nozzle plate 4).

The head portion 36a of the joint part 36 is disposed in the joint housing part 48 so as to be slidable. Thus, when the nozzle support 6 tilts, the head portion 36a tilts smoothly in accordance with the tilting of the nozzle support 6. Further, the trunk portion 36b of the joint part 36 is loosely inserted into the through hole 58 formed on the nozzle mount 2. Thus, when the nozzle support 6 tilts, the trunk portion 36b can tilt to a predetermined angle in accordance with the tilting of the nozzle support 6.

As a result, according to the above embodiment, the trunk portion 36b of the joint part 36 is loosely inserted, i.e., inserted with allowance, into the through hole 58 of the nozzle mount 2 and the nozzle plate 4, while the head portion 36a of the joint part 36 is disposed slidably in the joint housing part 48 formed in a recess shape on the second surface 2b (4b) of the nozzle mount 2 (nozzle plate 4). Thus, it is possible to tilt the nozzle support 6 along the radial direction while the nozzle support 6 and the nozzle mount 2 (nozzle plate 4) are stably joined.

In one embodiment, as illustrated in FIG. 10, the joint part 36 includes a fastening member such as a bolt coupled to the end surface 6as (6bs) of the nozzle support body 6M. In the embodiment illustrated in FIG. 10, for instance, the trunk portion 36b of the bolt 36 is screwed with the nozzle support body 6M, so as to be joined to the end surface 6as of the nozzle support body 6M.

According to the above embodiment, it is possible to form the above joint part 36 with a simplified configuration in which a fastening member such as a bolt is merely joined to the end surface 6as (6bs) of the nozzle support body 6M.

In the embodiment illustrated in FIG. 10, the nozzle support body 6M and the nozzle mount 2 are joined to each other by one bolt 36. However, both of the nozzle mount 2 and the nozzle plate 4 may be joined to the nozzle support body 6M by the same one bolt 36 having a great length. In this case, the nozzle support body 6M is formed to have a cylindrical shape with a thread formed across the entire length of the nozzle support body 6M, and the long bolt 36 is screwed into the cylindrical nozzle support body 6M from one end side. Then, a nut is screwed onto the bolt 36 protruding from the other end side so as to form the head portion 36a at the distal end side.

Figure 11:
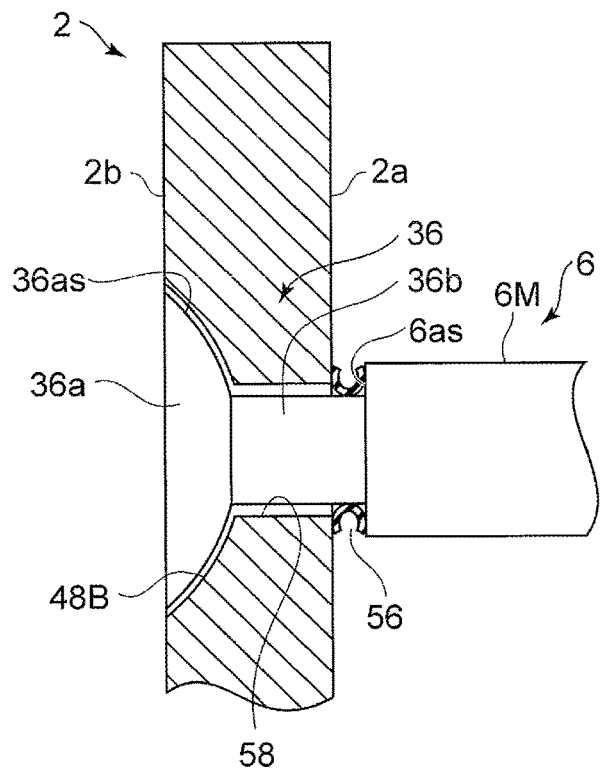
FIG. 11 is a diagram of a joint structure among a nozzle support, a nozzle mount and a nozzle plate according to one embodiment.

In another embodiment, as illustrated in FIGS. 11 to 13, the head portion 36a of the joint part 36 is formed by inserting the trunk portion 36b into the through hole 58 loosely, and swaging the distal end of the trunk portion 36b while the distal end of the trunk portion 36b is protruding from the joint housing part 48.

According to the above embodiment, it is possible to form the above joint part 36 by swaging the distal end portion of the trunk portion 36b, which makes it possible to reduce the number of constituent members as compared to a case where a fastening member, for instance, is used to form the joint part 36.

Figure 10A:
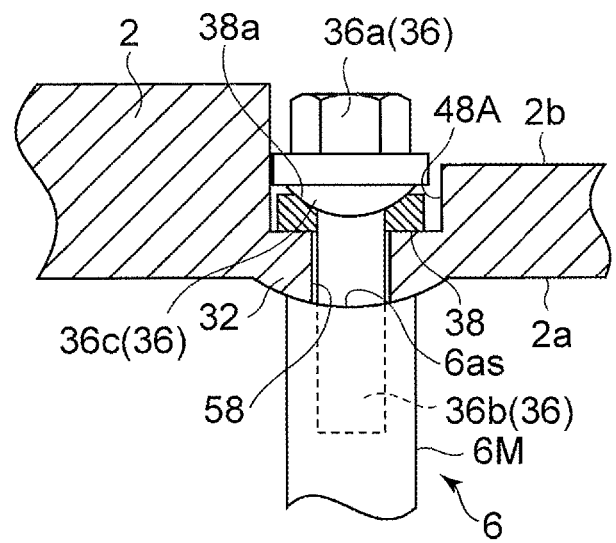
FIGS. 10A and 10B are diagrams of a joint structure among a nozzle support, a nozzle mount and a nozzle plate according to one embodiment.
Figure 10B:
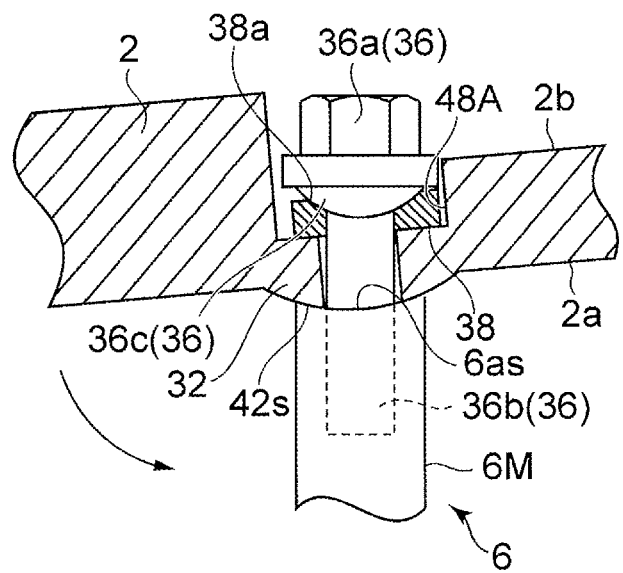

Further, in some embodiments, as illustrated in FIGS. 10A and 10B, a spherical washer 38 is disposed on the joint housing part 48A formed in a rectangular recess shape. Further, the fastening member 36 includes a spherical convex portion 36c disposed between the head portion 36a and the trunk portion 36b. The spherical convex portion 36c is formed so as to be slidable with respect to a spherical concave seating surface 38a of the spherical washer 38. As illustrated in FIG. 10B, the spherical convex portion 36c of the fastening member 36 and the spherical concave seating surface 38a of the spherical washer 38 slide with respect to each other, so that the nozzle support 6 quickly tilts along the radial direction.

According to the above embodiment, in a case where the above joint part is formed by the fastening member 36, it is possible to dispose the head portion 36a of the joint part 36 slidably in the joint housing part 48A, with a simplified configuration in which the spherical washer 38 is disposed on the joint housing part 48A.

Further, in some embodiments, as illustrated in FIG. 11, the above joint housing part 48 is formed as a joint housing part 48B formed in a spherical concave shape. The head portion 36a of the joint part 36 is formed to have a spherical convex shape on a trunk-portion-side surface 36as so as to fit slidably with the joint housing part 48B formed in a spherical concave shape. The trunk-portion-side surface 36as and the joint housing part 48B slide with respect to each other, so that the nozzle support 6 tilts quickly along the radial direction.

According to the above embodiment, it is possible to dispose the head portion 36a of the joint part 36 slidably in the joint housing part 48B with a simplified configuration.

Further, in some embodiments, as illustrated in FIG. 12, the above joint housing part 48 is formed as a joint housing part 48C having a conical (truncated conical) concave shape. An elastic member 60 is disposed between the head portion 36a of the joint part 36 and the joint housing part 48C formed in a conical concave shape. Such a joint housing part 48C having a conical shape is easy to process as compared to the above joint housing part 48B of a spherical shape. The elastic member 60 is made of a metal gasket formed in a hollow disc shape, for instance. The elastic member 60 deforms elastically when the nozzle support 6 tilts, so that the nozzle support 6 tilts quickly in the radial direction.

According to the above embodiment, it is possible to dispose the head portion 36a of the joint part 36 slidably in the joint housing part 48C with a simplified configuration in which the elastic member 60 is merely disposed between the head portion 36a of the joint part 36 and the joint housing part 48C. Further, the joint housing part 48C and the head portion 36a of the joint part 36 can be formed into a simple shape including a conical shape (truncated conical shape).

Further, in one embodiment, as illustrated in FIGS. 10A and 10B, a spherical section 32 formed into a spherical shape is formed in a convex shape on the first surface 2a of the nozzle mount 2, and the first end surface 6as of the nozzle support body 6M is formed into a concave shape, for instance, so as to be slidable with respect to the spherical section 32.

The shape of the first end surface 6as only needs to be a shape that is slidable with respect to the spherical section 32, so it is not particularly limited. Further, the spherical section 32 may be formed in a concave shape.

According to the above embodiment, the spherical section 32 formed on the first surface 2a of the nozzle mount 2 slides with the first end surface 6as of the nozzle support body 6M, so that the nozzle support 6 can tilt in a smooth motion, which makes it possible to absorb the relative displacement between the nozzle mount 2 and the nozzle plate 4 quickly in the radial direction.

In yet another embodiment, as illustrated in FIGS. 11 and 12, the second elastic member 56 is disposed between the first end surface 6as of the nozzle support body 6M and the first surface 2a of the nozzle mount 2. The second elastic member 56 is made of an elastically-deformable material such as an annular metal seal material. The second elastic member 56 elastically deforms when the nozzle support 6 tilts, so that the nozzle support 6 tilts quickly in the radial direction.

According to the above embodiment, it is possible to tilt the nozzle support 6 in a smooth motion, with a simplified configuration in which the second elastic member 56 is merely disposed between the first surface 2a of the nozzle mount 2 and the first end surface 6as of the nozzle support body 6M. Thus, it is possible to absorb the relative displacement in the radial direction between the nozzle mount 2 and the nozzle plate 4.

Figure 13A:
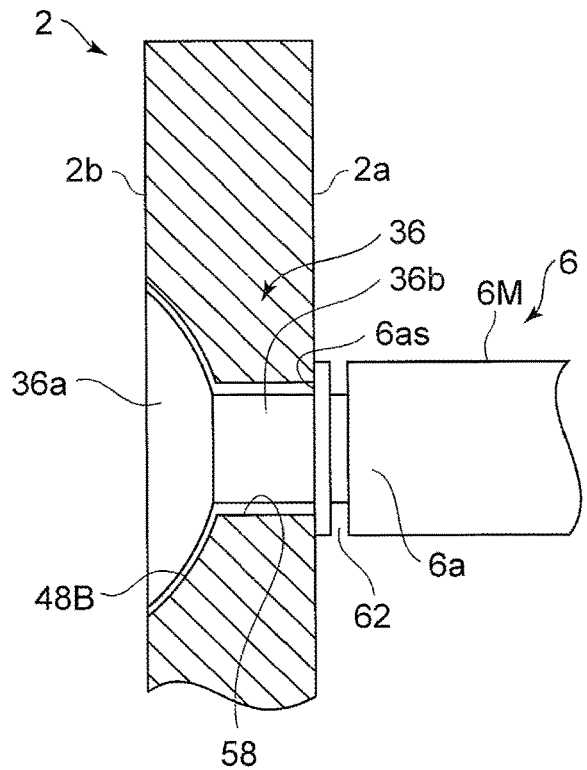
FIG. 13A and FIG. 13B are diagrams of a joint structure among a nozzle support, a nozzle mount and a nozzle plate according to one embodiment.
Figure 13B:
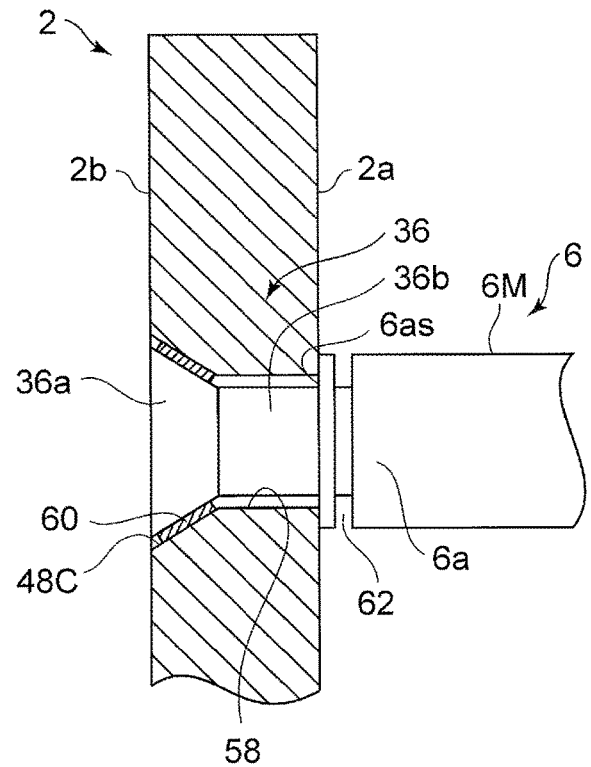

Further, in some embodiments, as illustrated in FIGS. 13A and 13B, a slit 62 for allowing the nozzle support body 6M to tilt along the radial direction is formed on the first end portion 6a of the nozzle support body 6M. The slit 62 may be formed in a continuous circumferential shape as illustrated in FIGS. 13A and 13B, but it only needs to be formed so that the nozzle support body 6M is capable of tilting in the radial direction. Further, to follow the warping deformation of the nozzle mount 2, the slit 62 may be formed on an outer side in the radial direction at the first end portion 6a of the nozzle support 6, and on an inner side in the radial direction at the second end portion 6b of the nozzle support 6. Here, FIG. 13A corresponds to the embodiment illustrated in FIG. 11, and FIG. 13A corresponds to the embodiment illustrated in FIG. 12.

According to the above embodiment, it is possible to tilt the nozzle support 6 in a smooth motion with a simplified configuration in which the slit 62 is merely formed on the first end portion 6a of the nozzle support body 6M and the number of the constituent members is small. Further, it is possible to absorb the relative displacement in the radial direction between the nozzle mount 2 and the nozzle plate 4 quickly.

Figure 14A:
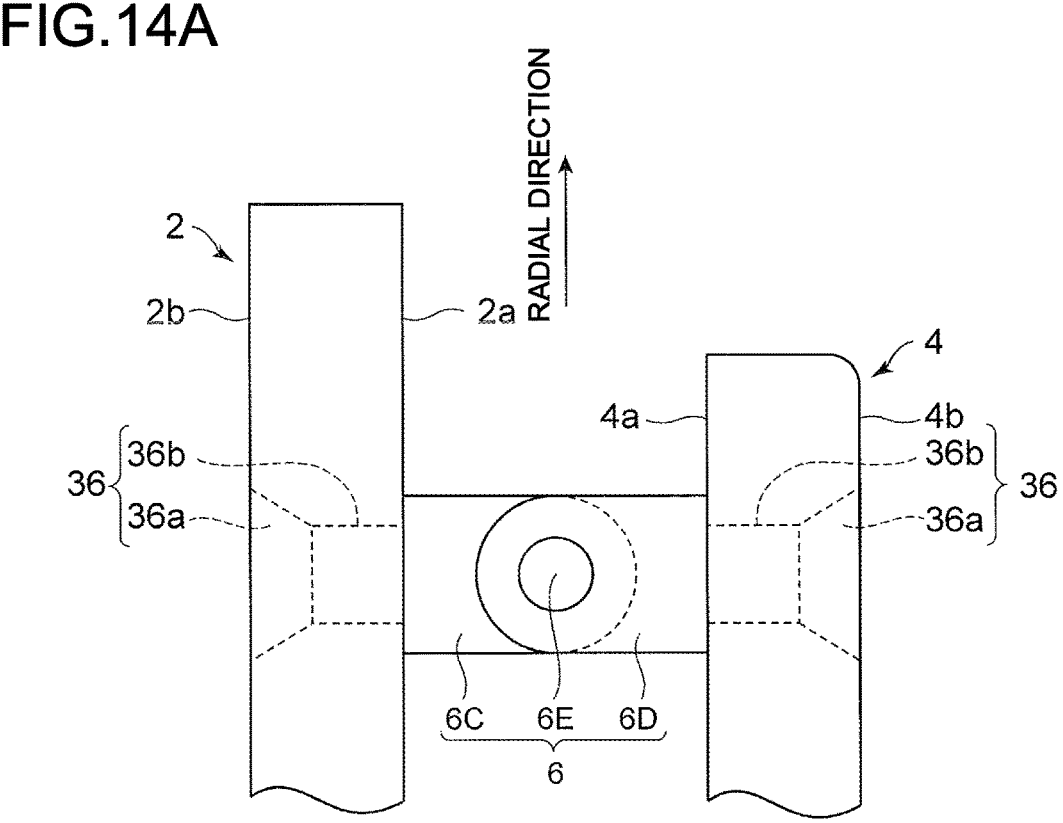
FIG. 14A and FIG. 14B are diagrams of a joint structure among a nozzle support, a nozzle mount and a nozzle plate according to one embodiment.
Figure 14B:
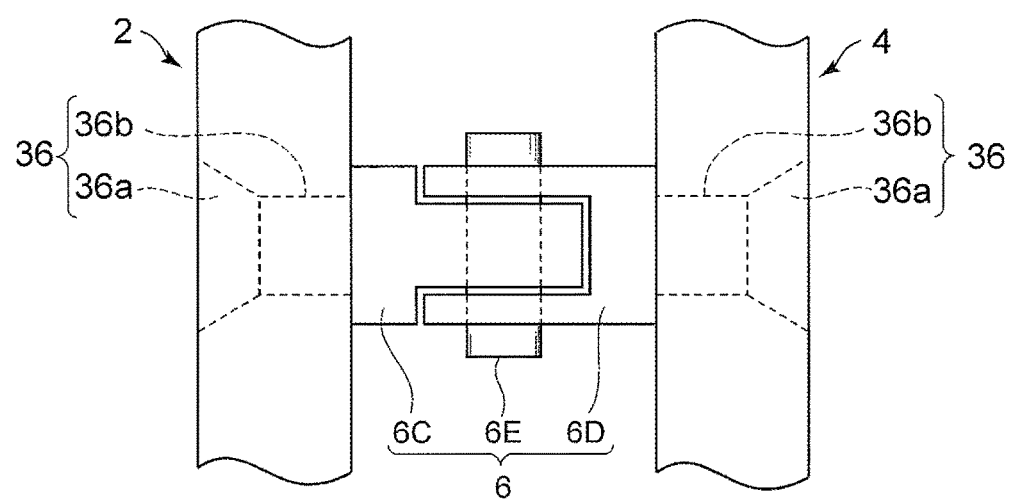
Figure 15:
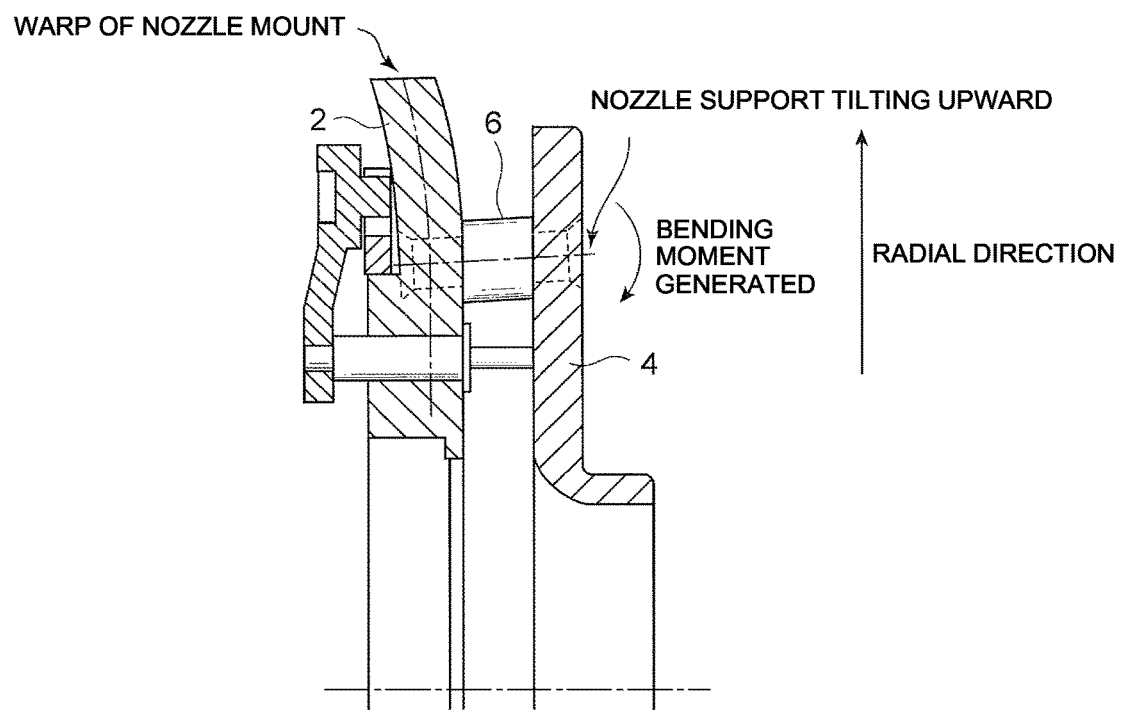
FIG. 15 is a diagram of a state where the nozzle mount and the nozzle plate have expanded due to heat, and a shearing force and a bending moment have been applied to the nozzle support coupling the nozzle mount and the nozzle plate.

FIG. 14A and FIG. 14B are diagrams of a joint structure among a nozzle support, a nozzle mount and a nozzle plate according to one embodiment. FIG. 14A is a planar view and FIG. 14B is a side view.

In some embodiments, as illustrated in FIGS. 14A and 14B, the nozzle support 6 includes a first-end-side support member 6C joined to the nozzle mount 2, a second-end-side support member 6D joined to the nozzle plate 4, and a pin member 6E coupling the first-end-side support member 6C and the second-end-side support member 6D rotatably in the radial direction. The nozzle support 6 is fastened to the nozzle mount 2 and the nozzle plate 4 by a fastening member 36 such as a bolt so as to be immovable.

According to the above embodiment, the first-end-side support member 6C and the second-end-side support member 6D are coupled to each other so as to be rotatable in the radial direction, so that the nozzle support 6 is capable of tilting at least along the radial direction. Thus, deformation and damage of the nozzle support 6 is prevented.

In some embodiments, the nozzle mount 2 is formed from a material having a linear expansion coefficient smaller than that of a material forming the nozzle plate 4. For instance, the nozzle mount 2 may be formed from a heat-resistant Ni-based alloy such as Inconel (Registered trademark; Inconel 600, Inconel 625, Inconel 718, Inconel 750X, etc.) and Hastelloy (Registered trademark; Hastelloy C22, Hastelloy C276, Hastelloy B, etc.) having a small linear expansion coefficient, and the nozzle plate 4 may be formed from a material having a larger linear expansion coefficient than the above, such as stainless steel.

According to the above embodiment, the nozzle plate 4 is made from a material that easily expands due to heat as compared to the nozzle mount 2. Thus, it is possible to restrict the rotation angle at a joint between the nozzle support 6 and the nozzle mount 2 and the nozzle plate 4, or a joint between the first-end-side support member 6C and the second-end-side support member 6D in the embodiment illustrated in FIGS. 14A and 14B, at the time when the nozzle mount 2 deforms so as to warp toward the second surface 2b due to the thermal expansion of the nozzle plate 4. As a result, it is possible to reduce abrasion at the joint.

Embodiments of the present invention were described in detail above, but the present invention is not limited thereto, and various amendments and modifications may be implemented within a scope that does not depart from the present invention.

The variable-geometry exhaust turbine according to at least one embodiment of the present invention is suitably used as a turbocharger for an automobile engine, and for a gasoline engine in particular, which emits exhaust gas having a higher temperature than a diesel engine.

DESCRIPTION OF THE REFERENCE NUMERAL

1 Variable-geometry exhaust turbine
2 Nozzle mount
3 Lever plate
4 Nozzle plate
5 Drive ring
6 Nozzle support
6A First-end-side segment
6B Second-end-side segment
6C First-end-side support member
6D Second-end-side support member
6E Pin member
6a First end portion
6as First end surface
6b Second end portion
6bs Second end surface
8 Nozzle vane
10 Variable nozzle mechanism
12 Turbine rotor
12a Rotation shaft
16 Turbine housing
18 Bearing housing
20 Exhaust gas channel
22 Bearing
24 Exhaust-gas outlet
32 Spherical section
36 Joint part
36a Head portion
36b Trunk portion
38 Spherical washer
42 Mount-side housing-and-retaining part (housing-and-retaining part)
42A Insert inlet
42B Press-fit inlet
42s Receiving seat surface
44 Plate-side housing-and-retaining part (housing-and-retaining part)
44 Insert inlet
44B Press-fit inlet
46 Retaining member
48 Joint housing part
52 Retaining-and-housing part forming body
56 Second elastic member
58 Through hole
60 Elastic member
62 Slit

The invention claimed is:

1. A variable-geometry exhaust turbine, comprising:
a nozzle mount including a first surface and a second surface;
a nozzle support including a first end portion and a second end portion, the first end portion being joined to the first surface of the nozzle mount;
a nozzle plate including a first surface and a second surface, the first surface of the nozzle plate being joined to the second end portion of the nozzle support and supported so as to face the nozzle mount and to be spaced from the nozzle mount, and the second surface of the nozzle plate facing an exhaust gas channel through which exhaust gas flows; and
at least one nozzle vane supported rotatably between the nozzle mount and the nozzle plate,
wherein the nozzle support includes a mechanism for tilting along a radial direction so as to absorb a relative displacement in the radial direction between the nozzle mount and the nozzle plate due to thermal expansion.

2. The variable-geometry exhaust turbine according to claim 1,
wherein at least one of the first end portion or the second end portion of the nozzle support comprises an end portion formed in a spherical shape, and
wherein a housing-and-retaining part is formed on at least one of the nozzle mount or the nozzle plate, the housing-and-retaining part slidably housing the end portion formed in the spherical shape.

3. The variable-geometry exhaust turbine according to claim 2,
wherein the end portion formed in the spherical shape of the nozzle support is housed in the housing-and-retaining part, by swaging an insertion inlet of the housing-and-retaining part while the end portion formed in the spherical shape is inserted from the insertion inlet to be disposed in the housing-and-retaining part, the insertion inlet being an opening into which the end portion formed in the spherical shape is loosely insertable.

4. The variable-geometry exhaust turbine according to claim 3,
wherein the housing-and-retaining part includes a mount-side housing-and-retaining part formed on the nozzle mount and a plate-side housing-and-retaining part formed on the nozzle plate, and the nozzle support is formed in a spherical shape at both of the first end portion and the second end portion, and
wherein the insertion inlet of the mount-side housing-and-retaining part is formed on the first surface of the nozzle mount facing the nozzle plate, and the insertion inlet of the plate-side housing-and-retaining part is formed on the first surface of the nozzle plate facing the nozzle mount.

5. The variable-geometry exhaust turbine according to claim 3,
wherein a housing-and-retaining part forming body is fixed to at least one of the nozzle mount or the nozzle plate, the housing-and-retaining part forming body being formed as a separate member from the nozzle mount and the nozzle plate, and including the housing-and-retaining part formed inside.

6. The variable-geometry exhaust turbine according to claim 2,
wherein the end portion formed in the spherical shape of the nozzle support is housed in the housing-and-retaining part, by fixing a retaining member formed as a separate member from the nozzle mount and the nozzle plate into an insertion inlet of the housing-and-retaining part while the end portion formed in the spherical shape is inserted from the insertion inlet to be disposed in the housing-and-retaining part, the insertion inlet being an opening into which the end portion formed in the spherical shape is loosely insertable.

7. The variable-geometry exhaust turbine according to claim 2,
wherein the end portion formed in the spherical shape of the nozzle support is housed in the housing-and-retaining part, by press fitting the end portion formed in the spherical shape from a press-fit inlet of the housing-and-retaining part, the press-fit inlet being an opening into which the end portion formed in the spherical shape is not loosely insertable.

8. The variable-geometry exhaust turbine according to claim 2,
wherein the nozzle support includes two segments, which are a first-end-side segment having the first end portion formed in the spherical shape and a second-end-side segment having the second end portion formed in the spherical shape, and
wherein the first-end-side segment and the second-end-side segment are joined to each other while the first end portion of the first-end-side segment is housed in a mount-side housing-and-retaining part formed on the nozzle mount and the second end portion of the second-end-side segment is housed in a plate-side housing-and-retaining part formed on the nozzle plate.

9. The variable-geometry exhaust turbine according to claim 1,
wherein the nozzle support includes a nozzle support body, and a joint part including a trunk portion having a rod shape and protruding from at least one of end surfaces of the nozzle support body and a head portion disposed on a distal end side of the trunk portion, the head portion having a cross section larger than that of the trunk portion, and
wherein a through hole into which the trunk portion of the joint part is loosely inserted is formed on at least one of the nozzle mount or the nozzle plate, and a joint housing part in which the head portion of the joint part is slidably disposed is formed in a recess shape on the second surface of the at least one of the nozzle mount or the nozzle plate.

10. The variable-geometry exhaust turbine according to claim 9,
wherein the joint part includes a fastening member joined to one of the end surfaces of the nozzle support body.

11. The variable-geometry exhaust turbine according to claim 10,
wherein a spherical washer is disposed on the joint housing part, and
wherein the fastening member includes a spherical convex portion formed so as to be slidable with respect to a spherical concave seating surface of the spherical washer, between the head portion and the trunk portion.

12. The variable-geometry exhaust turbine according to claim 11,
wherein a spherical section formed in a spherical shape is formed on the first surface of at least one of the nozzle mount or the nozzle plate, and
wherein at least one of the end surfaces of the nozzle support body is formed so as to be slidable with respect to the spherical section.

13. The variable-geometry exhaust turbine according to claim 9,
wherein the head portion of the joint part is formed by swaging a distal end of the trunk portion, while the trunk portion is loosely inserted into the through hole and a distal end side of the trunk portion is protruded from the joint housing part.

14. The variable-geometry exhaust turbine according to claim 9,
wherein the joint housing part is formed in a spherical concave shape, and
wherein the head portion of the joint part is formed in a spherical convex shape at a side adjacent to the trunk portion so as to fit slidably with the joint housing part formed in a spherical concave shape.

15. The variable-geometry exhaust turbine according to claim 14,
wherein a second elastic member is disposed between at least one of the end surfaces of the nozzle support body and the first surface of at least one of the nozzle mount or the nozzle plate.

16. The variable-geometry exhaust turbine according to any one of claim 14,
wherein a slit for allowing tilting of the nozzle support body along the radial direction is formed on at least one of end portions of the nozzle support body.

17. The variable-geometry exhaust turbine according to claim 9,
wherein the joint housing part is formed in a conical concave shape, and
wherein an elastic member is disposed between the head portion of the joint part and the joint housing part formed in the conical concave shape.

18. The variable-geometry exhaust turbine according to claim 1,
wherein the nozzle support includes a first-end-side support member joined to the nozzle mount, a second-end-side support member joined to the nozzle plate, and a pin member which joins the first-end-side support member and the second-end-side support member rotatably along the radial direction.

19. The variable-geometry exhaust turbine according to claim 1,
wherein the nozzle mount is formed from a material having a linear expansion coefficient smaller than that of a material forming the nozzle plate.

20. The variable-geometry exhaust turbine according to claim 1,
wherein the variable-geometry exhaust turbine is used for a gasoline engine.

* * * * *